Patented Oct. 6, 1953

2,654,774

UNITED STATES PATENT OFFICE 2,654,774

METHOD OF MAKING 4-TERTIARY-BUTYL-PHENYL SALICYLATE

Wesley C. Stoesser, Midland, and Edmund H. Sommerfield, Bay City, Mich., assignors to The Dow Chemical Company, Midland, Mich., a corporation of Delaware No Drawing. Application May 15, 1950, Serial No. 162,137

4 Claims. (Cl. 260—474)

This invention concerns an improved method of making aryl esters of salicylic acid. It relates more particularly to the production of 4-tertiary-butylphenyl salicylate by reaction of 4-tertiary-butylphenol and salicylic acid.

It is known to prepare aryl esters, e. g. salol or 4-tertiary-butyl salol, by reaction of a phenol and salicylic acid in the presence of phosphorus oxychloride as a catalyst. The reaction proceeds readily, but is frequently accompanied by the formation of objectionable colored compounds which have to be removed from the desired product in order to render it satisfactory for use of the market. Also, the use of phosphorus oxychloride as catalyst or condensing agent in the reaction for the production of 4-tertiary-butyl salol leads to the formation of a large proportion, e. g. 30 per cent by weight or more of the starting materials, of an undesirable by-product material, or residue, which results in low over-all yields of the desired product.

We have now discovered that 4-tertiary-butylphenyl salicylate can readily be obtained in good yield by heating a mixture consisting of 4-tertiary-butylphenol and salicylic acid to a reaction temperature between 200° and 280° C. in the absence of a catalyst. We have further found that the residue from a previous reaction of the 4-tertiary-butylphenol and the salicylic acid starting materials, can be added to the next or a succeeding reaction to produce an improved yield of the 4-tertiary-butylphenyl salicylate product. The addition of the residue to the reaction not only leads to the formation of increased yields of the 4-tertiary-butylphenyl salicylate product, but also appears to prevent, or substantially reduce, the tendency toward the formation of additional amounts of the residue.

The 4-tertiary-butylphenol and the salicylic acid starting materials may be employed in any desired proportions, but for reasons of economy are preferably used in equimolecular proportions, or substantially equimolecular proportions, i. e. in amounts corresponding to approximately one molecular proportion of the 4-tertiary-butylphenol per molecular equivalent proportion of the salicylic acid. When the reaction is carried out in admixture with the residue from a previous reaction of 4-tertiary-butylphenol and salicylic acid, the salicylic acid is usually employed in lesser amounts than that just mentioned. Such residue is obtained by vacuum stripping the reaction product of 4-tertiary-butylphenol and salicylic acid to recover unreacted 4-tertiary-butylphenol, together with lower boiling by-products of the reaction, e. g. phenol, and thereafter separating the 4-tertiary-butylphenyl salicylate from the crude product by crystallization from an alcohol, or in other usual ways, e. g. by distillation. The residue remaining after recovery of the 4-tertiary-butylphenyl salicylate usually consists principally of by-products of unknown composition, together with lesser amounts of 4-tertiary-butylphenol and salicylic acid.

In general, when the residue from a previous reaction of 4-tertiary-butylphenol and salicylic acid is added to the next or a succeeding reaction, the starting materials, or components of the reaction, are mixed together in amounts corresponding to from 20 to 30 per cent by weight of the salicylic acid, from 45 to 60 per cent of the 4-tertiary-butylphenol and from 15 to 35 per cent of the residue from a previous reaction, based on the combined weight of the starting materials.

The reaction may be carried out at temperatures between 200° and 280° C., preferably 240° to 270° C. and at atmospheric or substantially atmospheric pressure. The reaction may conveniently be carried out by heating a mixture of the reactants to a reaction temperature within the range just stated, in glass, or in an enameled steel vessel, while vaporizing and distilling the water formed in the reaction so as to remove it from contact with the reaction mixture.

In practice, the 4-tertiary-butylphenol and the salicylic acid reactants in the desired proportions are placed in a suitable vessel and the mixture is heated to melt the reactants. Thereafter, the mixture is heated to a reaction temperature of from 200° to 280° C., preferably 240° to 270° C. until the reaction is substantially complete. The reaction is usually complete in from one to two hours at temperatures between 240° and 270° C. Water formed in the reaction is vaporized and removed as it is formed. The reaction mixture is vacuum stripped to recover and separate the unreacted 4-tertiary-butylphenol and lower boiling by-products of the reaction, e. g. phenol, from the crude 4-tertiary-butylphenyl salicylate product. The 4-tertiary-butylphenyl salicylate is purified preferably by crystallization from alcohol. Usually, from 0.5 to 1 part by weight of the alcohol per part of the crude 4-tertiary-butylphenyl salicylate is employed in the crystallization step. The crystalline product is separated by filtration and washed with alcohol. The filtrate, or mother liquor, is combined with the alcohol wash liquor and the alcohol evaporated. The solvent free residue recovered from the mother liquor, after crystallization of the 4- tertiary-butylphenyl salicylate from the vacuum stripped reaction mixture of 4-tertiary-butylphenol and salicylic acid in the absence of a catalyst, is a liquid at temperatures of about 60° C., or higher. It partially solidifies on cooling to a temperature of ordinary temperatures, e. g. a temperature of 25° C., over a period of several days. The residue consists principally of a complex product of unknown composition boiling at temperatures higher than the boiling point of 4-tertiary-butylphenol, together with lesser amounts of salicylic acid. The solvent free residue recovered from the mother liquor after crystallization of the 4-tertiary-butylphenyl salicylate product, may be incorporated with, or added to, the next or a succeeding reaction, together with the 4-tertiary-butylphenol and the salicylic acid starting materials, to form an additional amount of 4-tertiary-butylphenyl salicylate.

The following examples illustrate ways in which the principle of the invention has been applied but are not to be construed as limiting the invention:

Example 1

A mixture consisting of 150 grams (1 mole) of 4-tertiary-butylphenol and 138 grams (1 mole) of salicylic acid was placed in a glass reaction flask equipped with a short distilling column and condenser. The mixture was heated to a temperature of 240° C. The temperature of the mixture was gradually raised to 253° C. over a period of one hour, then cooled. Water formed in the reaction was removed through the distilling column and condenser. The crude product was vacuum stripped by heating the same to a temperature of 180° C. at an absolute pressure of 12 millimeters, to separate unreacted 4-tertiary-butylphenol and lower boiling components from the liquid. There were obtained 14.7 grams of phenol, 85.1 grams of 4-tertiary-butylphenol and 166.1 grams of vacuum stripped product. The vacuum stripped product was mixed with 100 grams of ethyl alcohol and the mixture heated to a temperature of about 70° C., then cooled to crystallize the 4-tertiary-butylphenyl salicylate product. The crystalline product was separated by filtering the mixture and was washed with ethyl alcohol and dried. There was obtained 105 grams of 4-tertiary-butylphenyl salicylate, as white crystals having a freezing point of 63° C. The filtrate was combined with the alcohol wash liquor and the alcohol evaporated. There was obtained 60.5 grams of residue. The yield of 4-tertiary-butylphenyl salicylate was 90.3 per cent, based on the 4-tertiary-butylphenol consumed in the reaction.

Example 2

A mixture consisting of 69 grams (0.5 mole) of salicylic acid, 160.1 grams (1.07 moles) of 4-tertiary-butylphenol and the 60.5 grams of residue from Example 1, was placed in a glass reaction flask equipped with a distilling column and a condenser. The mixture was heated to temperatures between 244° and 251.5° C. over a period of one hour, then cooled. The water formed in the reaction was vaporized and removed as it was formed. The reaction product was heated to a temperature of 180° C. at an absolute pressure of 12 millimeters while separating phenol and unreacted 4-tertiary-butylphenol, therefrom by distillation. There were obtained 14.2 grams of phenol, 97.6 grams of 4-tertiary-butylphenol and 164.5 grams of crude product. The crude product was cooled and was mixed with 100 grams of ethyl alcohol and the resulting mixture further cooled to crystallize the 4-tertiary-butylphenyl salicylate product. The crystalline product was separated by filtering the mixture and was washed with alcohol and dried. There was obtained 105.6 grams (0.39 mole) of 4-tertiary-butylphenyl salicylate as white crystals having a freezing point of 63° C. The filtrate was combined with the alcohol wash liquor and the alcohol evaporated. There was obtained 59 grams of residue. The yield of 4-tertiary-butylphenyl salicylate was 92.7 per cent, based on the 4-tertiary-butylphenol consumed in the reaction.

Example 3

A mixture consisting of 27.6 grams (0.2 mole) of salicylic acid and 30 grams (0.2 mole) of 4-tertiary-butylphenol was placed in a distilling flask equipped with a short column and a condenser. The mixture was heated to temperatures between 200° and 210° C. over a period of 5 hours. Water formed in the reaction was vaporized and removed from the reaction mixture via the distilling column and condenser. There was obtained 3.4 grams of water. The reaction mixture was cooled and was mixed with about 60 cc. of ethyl alcohol at 70° C. and the mixture further cooled to crystallize the 4-tertiary-butylphenyl salicylate product. The crystalline product was separated by filtering the mixture and was washed with ethyl alcohol and dried. There was obtained 22.8 grams (0.084 mole) of 4-tertiary-butylphenyl salicylate as white crystals having a freezing point of 63° C.

Example 4

A mixture consisting of 76 grams (0.55 mole) of salicylic acid, 147 grams (0.98 mole) of 4-tertiary-butylphenol and 70.6 grams of the residue from a previous reaction of equimolecular proportions of salicylic acid and 4-tertiary-butylphenol in the absence of a catalyst, was placed in a glass reaction flask equipped with a short distilling column and condenser. The mixture was heated to a temperature of 243° C. over a period of one hour, then cooled. The water formed in the reaction was vaporized and distilled. The reaction product was heated to a temperature of about 180° C. at an absolute pressure of 12 millimeters, while distilling phenol and unreacted 4-tertiary-butylphenol from the liquid. There were obtained 12 grams of phenol and 75.8 grams of 4-tertiary-butylphenol. The vacuum stripped product, after cooling, was mixed with an equal volume of ethyl alcohol and the mixture was further cooled to crystallize the 4-tertiary-butylphenyl salicylate product. The crystalline product was separated by filtering the mixture and was washed with alcohol and dried. There was obtained 122 grams (0.45 mole) of 4-tertiary-butylphenyl salicylate. The filtrate, or mother liquor, was heated to evaporate the alcohol. There was obtained 67 grams of residue. The yield of 4-tertiary-butylphenyl salicylate was 93.8 per cent, based on the 4-tertiary-butylphenol consumed in the reaction.

Example 5

A mixture consisting of 76 grams (0.55 mole) of salicylic acid, 75 grams (0.5 mole) of 4-tertiary-butylphenol and the 67 grams of residue from Example 4, was placed in a distilling flask and heated to a reaction temperature of from 246° to 272° C. over a period of one hour. Thereafter the procedure for recovering the products of the reaction was the same as that described in Example 4. There were obtained 0.1 grams of phenol, 22.6 grams of 4-tertiary-butylphenol, 94.6 grams (0.35 mole) of 4-tertiary-butylphenyl salicylate and 75.4 grams of residue. The yield of 4-tertiary-butylphenyl salicylate was 100 per cent, based on the 4-tertiary-butylphenol consumed in the reaction.

*Example 6*

A mixture consisting of 76 grams (0.55 mole) of salicylic acid, 150 grams (1.0 mole) of 4-tertiary-butylphenol and 66.5 grams of the residue from a previous reaction of 4-tertiary-butylphenol and salicylic acid, was placed in a distilling flask and the mixture heated to a reaction temperature of from 241° to 255° C. over a period of one hour. Water was distilled from the reaction as it formed. The procedure for recovering the products of the reaction was the same as that described in Example 4. There were obtained 14.2 grams of phenol, 84.1 grams of 4-tertiary-butylphenol, 110.4 grams of 4-tertiary-butylphenyl salicylate and 68 grams of residue. The yield of 4-tertiary-butylphenyl salicylate was 93 per cent, based on the 4-tertiary-butylphenol consumed in the reaction.

*Example 7*

A mixture consisting of 69 grams (0.5 mole) of salicylic acid, 150 grams (1.0 mole) of 4-tertiary-butylphenol and 50.8 grams of the residue from a previous reaction of 4-tertiary-butylphenol and salicylic acid was placed in a reaction flask equipped with a short distilling column and condenser. The mixture was stirred and heated to a temperature of from 241° to 256° C. over a period of one hour. Water was distilled from the reaction as it was formed. Thereafter, the products of the reaction were separated by procedure similar to that described in Example 2. There were obtained 12.9 grams of phenol, 81.0 grams of 4-tertiary-butylphenol, 107.6 grams of 4-tertiary-butylphenyl salicylate and 54.1 grams of residue. The 4-tertiary-butylphenyl salicylate was obtained as white crystals having a freezing point of 63° C. The yield of 4-tertiary-butylphenyl salicylate was 86.7 per cent, based on the 4-tertiary-butylphenol consumed in the reaction.

Although the invention has been described with regard to the preparation of 4-tertiary-butylphenyl salicylate by reaction of 4-tertiary-butylphenol and salicylic acid, the method may be used to prepare other aryl esters of salicylic acid, e. g. by reaction of salicylic acid and phenol, 4-isopropylphenol, sec.-butylphenol, or 4-chlorophenol.

Other modes of applying the principle of the invention may be employed instead of those explained, change being made with regard to the steps or compounds herein employed, provided the step or steps or the compounds stated in any of the following claims or the equivalent of such steps or compounds be employed.

We claim:

1. A method of making 4-tertiary-butylphenyl salicylate by reaction of 4-tertiary-butylphenol and salicylic acid which comprises, mixing the salicylic acid and the 4-tertiary-butylphenol reactants with the residue from a previous reaction, heating the resulting mixture to a reaction temperature between 200° and 280° C. at substantially atmospheric pressure while distilling water from the reaction zone as it is formed and thereafter separating 4-tertiary-butylphenyl salicylate from the reaction mixture.

2. A method of making 4-tertiary-butylphenyl salicylate by reaction of 4-tertiary-butylphenol and salicylic acid which comprises, heating a mixture consisting of from 20 to 30 per cent by weight of salicylate acid, from 45 to 60 per cent 4-tertiary-butylphenol and from 15 to 35 per cent of the residue from a previous reaction, based on the combined weight of the starting materials, to a reaction temperature between 200° and 280° C. at atmospheric pressure while distilling water from the reaction zone as it is formed and thereafter separating 4-tertiary-butylphenyl salicylate from the reaction mixture.

3. A method as claimed in claim 2 wherein the starting materials are heated to a reaction temperature between 240° and 270° C.

4. A method as claimed in claim 3 wherein the 4-tertiary-butylphenyl salicylate is separated from the reaction mixture by crystallization from an alcohol.

WESLEY C. STOESSER.
EDMUND H. SOMMERFIELD.

References Cited in the file of this patent

UNITED STATES PATENTS

| Number | Name | Date |
|---|---|---|
| 2,246,974 | Coleman et al. | June 24, 1941 |

OTHER REFERENCES

Groggins, Unit Processes in Organic Synthesis, pp. 628, 629 and 655 (1947 edition), McGraw-Hill Book Co., Inc., New York, N. Y.